Patented Jan. 20, 1953

2,626,277

UNITED STATES PATENT OFFICE 2,626,277

OXIDATION OF PETROLEUM FRACTIONS

Sylvan R. Merley, Riverton, and August Kofoet, Bellmawr, N. J., assignors, by mesne assignments, to Cities Service Research and Development Company, New York, N. Y., a corporation of New Jersey No Drawing. Application October 15, 1948, Serial No. 54,827

9 Claims. (Cl. 260—451)

This invention relates to the production of organic acids and alcohols and more particularly to a process for producing higher fatty acids and higher alcohols by means of the oxidation of petroleum fractions in the presence of peroxide catalysts.

It has been known for many years that long-chain fatty acids and alcohols may be produced by blowing hydrocarbon fractions such as paraffin wax in liquid phase with air at elevated temperatures. The oxidation processes heretofore commercially used have not proven satisfactory because of the extensive length of time required to initiate the reaction and to convert the major portion of the wax being treated to oxygenated products. Of necessity, operations requiring a long-time residence of wax in the reactor must be on a batch basis, thus increasing the investment and labor cost of a plant designed to produce fatty acids and higher alcohols from petroleum wax. Another disadvantage of prior processes for the oxidation of petroleum wax is that the long period of residence of the wax in the reactor tends to cause the formation of color bodies and tars which cannot easily be separated from the reaction products, thus lowering their desirability as commercial products.

We have discovered that if a petroleum fraction containing a minor proportion, say from $\frac{1}{10}$ to 2 per cent, of an organic peroxide having a boiling point above 300° F., is oxidized at temperatures in excess of 300° F. that the oxidation will initiate in a fraction of the time required if no catalyst is used, and that the major portion of the petroleum fraction under treatment will be rapidly converted into oxygenated products, with a minimum formation of color bodies and tars.

We have found that the addition of more than 2 per cent of the organic peroxides which we have found useful in this process does not interfere with the reaction, but that amounts up to 10 per cent give no better results than amounts of 2 per cent. Obviously, since these organic peroxides cannot easily be recovered in the process and are expensive, it is not desirable to add any more than is necessary to catalyze the oxidation reaction.

The results which may be obtained by the use of a peroxide in treating petroleum wax according to our new process, may be summarized in the following table, the time of production of the first drop of water overhead after arrival at the desired reaction temperature being taken as the time of initiation of oxidation. The apparatus used in the several runs consisted of a glass tube ten inches long and two inches in inside diameter, fitted with a fritted glass sparger, and surrounded with resistance wire to heat the wax to the desired reaction temperature, and to maintain the temperature at a constant value during the run. The peroxide was added to the wax at a temperature of 280° F., and the wax was then brought rapidly up to the desired reaction temperature, except that in the run at 260° F., the peroxide was added at the reaction temperature. Air was blown through the sparger under a pressure of 36 mm. of mercury.

Table I

| Temperature | Percent Cumene Hydroperoxide | Time of First Water Production |
|---|---|---|
| 350° F | none | 2¼ hours. |
| 350° F | 0.10 | 21 minutes. |
| 350° F | 0.25 | 15 minutes. |
| 350° F | 0.5 | 6 minutes. |
| 320° F | none | 3½ hours. |
| 320° F | 1.0 | 17 minutes. |
| 290° F | none | 5 hours+. |
| 290° F | 1.0 | 57 minutes. |
| 260° F | none | no reaction. |
| 260° F | 1.0 | 3⅓ hours. |

Thus it will be seen that it is possible to materially cut down the time of an oxidation run by using trace quantities of cumene hydroperoxide as an oxidation initiator. Furthermore, it was observed that when cumene hydroperoxide was used, the reaction proceeded to the desired degree of completion more rapidly than reactions carried on without the aid of the peroxide. In all cases the peroxide-catalyzed reaction produced products of much lighter color than those produced in the uncatalyzed reaction. Also, the production of hydroxy acids, usually considered an undesirable product of the oxidation process, was materially less than in the uncatalyzed runs.

In addition to cumene hydroperoxide, we have also used, with essentially the same results, a commercial mixture of hydrocarbon peroxides having an average of 6 to 7 carbon atoms per molecule and a boiling point slightly above 300° F. We have found, however, that the lower boiling peroxides such as ditertiary butyl peroxide, benzoyl peroxide, and hydrogen peroxide are unsuitable for use in this process, since they either explode when added to the mixture or the material boils out before the reaction temperature is reached and therefore exerts no catalytic effect upon the reaction. Peroxide precursors such as gum turpentine, have been used and have been found to be effective to some degree, but are not as effective as the higher boiling peroxides mentioned above.

Our new process is equally applicable to the oxidation of other petroleum fractions, such as petrolatum and fuel oils. We have found that, while these substances are more resistant to oxidation than paraffin wax, they may be successfully oxidized by means of our process, with a materially shorter induction time than is found in processes employing other catalysts, or no catalyst.

We have found that, besides the reduction in the time necessary to process a batch of paraffin wax, the reaction tends to go to the formation of esters, thereby tying up the low molecular weight acids with alcohols as they are formed, the yield of final oxidation product is increased, the tendency of further oxidation of alcohols to acids and hydroxy acids is reduced, and the color of the final product is much improved.

Our new and improved process makes use of inexpensive materials and the final product is not contaminated with metals, as is the case when metal catalysts such as barium stearate are used to shorten the induction period. The time required for the process may be reduced well under any commercial process for the production of similar types and amounts of oxidation products, and the color of the final product is light rather than dark brown as produced by conventional processes for the oxidation of petroleum fractions.

Having now described our invention, what we claim is:

1. The process of oxidizing petroleum fractions including blowing a paraffin wax in liquid phase with air in a reaction zone at temperatures in excess of 290° F. in the presence of from about 0.1 per cent to about 10 per cent of cumene hydroperoxide, the percentages being by weight of the paraffin wax the said peroxide serving to substantially reduce the induction period of the reaction.

2. The process of oxidizing petroleum fractions, including blowing a petroleum fraction boiling in the fuel oil range and higher in the liquid phase, with an oxygen-containing gas, in a reaction zone in the presence of a minor quantity of cumene hydroperoxide the said peroxide serving to substantially reduce the induction period of the reaction.

3. The process according to claim 2 in which the petroleum fraction is a fuel oil.

4. The process according to claim 2 in which the petroleum fraction is a petrolatum.

5. The process according to claim 2 in which the petroleum fraction is a petroleum wax.

6. The process of oxidizing petroleum fractions, including blowing a petroleum fraction boiling in the fuel oil range and higher in the liquid phase with an oxygen-containing gas in a reaction zone, at a temperature in excess of 290° F., in the presence of a minor quantity, sufficient to materially reduce the oxidation induction period of cumene hydroperoxide.

7. The process according to claim 6 in which the petroleum fraction is a fuel oil.

8. The process according to claim 6 in which the petroleum fraction is a petrolatum.

9. The process according to claim 6 in which the petroleum fraction is a paraffin wax.

SYLVAN R. MERLEY.
AUGUST KOFOET.

REFERENCES CITED

The following references are of record in the file of this patent:

UNITED STATES PATENTS

| Number | Name | Date |
| --- | --- | --- |
| 2,186,909 | Pollock | Jan. 9, 1940 |
| 2,226,378 | King et al. | Dec. 24, 1940 |
| 2,265,948 | Loder | Dec. 9, 1941 |
| 2,318,669 | Carr | May 11, 1943 |
| 2,421,392 | Rust et al. | June 3, 1947 |
| 2,469,322 | Armstrong et al. | May 3, 1949 |

FOREIGN PATENTS

| Number | Country | Date |
| --- | --- | --- |
| 610,293 | Great Britain | Oct. 13, 1948 |